(12) United States Patent
Kirsch

(10) Patent No.: US 12,111,182 B2
(45) Date of Patent: Oct. 8, 2024

(54) BASE OF A SUPPORTING OR MEASURING DEVICE

(71) Applicant: FIXTURE TECH SOLUTIONS GMBH, Tholey (DE)

(72) Inventor: Stephan Kirsch, Riegelsberg (DE)

(73) Assignee: FIXTURE TECH SOLUTIONS GMBH, Tholey (DE)

( * ) Notice: Subject to any disclaimer, the term of this patent is extended or adjusted under 35 U.S.C. 154(b) by 243 days.

(21) Appl. No.: 17/606,571

(22) PCT Filed: Mar. 16, 2020

(86) PCT No.: PCT/DE2020/100196
§ 371 (c)(1),
(2) Date: Oct. 26, 2021

(87) PCT Pub. No.: WO2020/221385
PCT Pub. Date: Nov. 5, 2020

(65) Prior Publication Data
US 2022/0214194 A1 Jul. 7, 2022

(30) Foreign Application Priority Data
May 2, 2019 (DE) ............ 10 2019 111 329.6

(51) Int. Cl.
*G01D 11/16* (2006.01)
*G01B 5/00* (2006.01)
(52) U.S. Cl.
CPC ........ *G01D 11/16* (2013.01); *G01B 5/0007* (2013.01); *G01B 5/0025* (2013.01)

(58) Field of Classification Search
CPC ..... G01D 11/16; G01B 5/0007; G01B 5/0025
See application file for complete search history.

(56) References Cited

U.S. PATENT DOCUMENTS

| | | | |
|---|---|---|---|
| 9,921,582 B2 | 3/2018 | Spicer | |
| 10,718,608 B2 | 7/2020 | Bindel | |
| 2005/0118003 A1* | 6/2005 | Mitchell | B65G 1/06 414/284 |
| 2007/0144409 A1* | 6/2007 | Zhu | G02B 7/00 428/116 |
| 2012/0179337 A1 | 7/2012 | Doan | |

(Continued)

FOREIGN PATENT DOCUMENTS

| | | | | |
|---|---|---|---|---|
| CN | 107472786 A | * | 12/2017 | .......... B65G 1/0492 |
| CN | 108620744 A | * | 10/2018 | ............. B23K 26/38 |

(Continued)

OTHER PUBLICATIONS

CN-108620744-A, English Translation (Year: 2018).*

(Continued)

*Primary Examiner* — Ryan D Walsh
(74) *Attorney, Agent, or Firm* — LUCAS & MERCANTI, LLP; Klaus P. Stoffel

(57) ABSTRACT

A base of a device for supporting a vehicle body component to be measured or for measuring such a component. The base can be moved in order to arrange the supporting or measuring device in a reference position, in particular on a floor on which the device sits in the reference position. The base preferably has a box-like design, including a top wall and a base wall which has a recess.

11 Claims, 1 Drawing Sheet

(56) References Cited

U.S. PATENT DOCUMENTS

| | | | | |
|---|---|---|---|---|
| 2017/0008701 A1* | 1/2017 | Terrill | ............... | B65G 1/0492 |
| 2017/0334643 A1* | 11/2017 | Itoh | ............... | B65G 1/0492 |
| 2022/0203648 A1* | 6/2022 | Kirsch | ............... | G01B 5/0007 |

FOREIGN PATENT DOCUMENTS

| | | | |
|---|---|---|---|
| DE | 3841971 C2 | | 7/1993 |
| DE | 102016205519 A1 | | 10/2017 |
| DE | 102017108148 A1 | | 10/2017 |
| DE | 102017108671 A1 | | 10/2018 |
| EP | 0809086 A2 | * | 11/1997 |
| JP | 2019202881 A | * | 11/2019 |
| KR | 101866207 B1 | * | 6/2018 |

OTHER PUBLICATIONS

JP-2019202881-A, English Translation (Year: 2019).*
International Search Report Dated Jun. 12, 2020, PCT/DE2020/100196, 3 Pages.
Video "Witte Sandwichplates (English)" available on YouTube since 2012 at https://www.youtube.com/watch?v=_wPPpbQMorc;
Catalog "ALUFIX Aug. 2011"; 2011, 22 pages.
Wikipedia excerpt "Mecanum wheel", Aug. 6, 2018 including machine English translation, 5 pages.

* cited by examiner

BASE OF A SUPPORTING OR MEASURING DEVICE

CROSS-REFERENCE TO RELATED APPLICATIONS

The present application is a 371 of International application PCT/DE2020/100196, filed Mar. 16, 2020, which claims priority of DE 10 2019 111 329.6, filed May 2, 2019, the priority of these applications is hereby claimed and these applications are incorporated herein by reference.

BACKGROUND OF THE INVENTION

The invention relates to a base plate of a device for holding a vehicle body component to be measured or for measuring such a component.

When measuring vehicle body components in the course of the development and production of vehicles there is the problem of holding these components in a reference position in relation to a measuring device in a deformation-free manner and possibly of transferring the held vehicle body component to such a position beforehand.

SUMMARY OF THE INVENTION

The present invention is based on the object of making it easier to transfer held vehicle body components to a position suitable for measurement with a measuring device.

This object is achieved by a base plate of the type mentioned in the introduction which according to the invention can be displaced for arrangement of the holding or measuring device in a reference position.

In a preferred embodiment of the invention, the base plate can be displaced on the ground by means of wheels and rests on the ground in the reference position, possibly via foot parts which protrude from the base plate toward the ground.

In a further particularly preferred embodiment of the invention, the base plate can be displaced on four wheels which are arranged correspondingly to the corners of a rectangle.

Preferably, the wheels are so-called Mecanum wheels which are driven individually and which have a rim composed of rollers that can be rotated freely about a respective axis inclined by 45° with respect to the wheel axle. By driving the wheels individually with a different direction of rotation and rotation speed, it is possible to move and turn the base plate in any desired directions on the ground.

In a further embodiment of the invention, the wheels can be extended from the base plate in the direction of the ground so as to raise the base plate. In the reference position, the wheels are then retracted and the base plate rests stably on the ground. While positioning that is sufficiently precise at least for optical measurements and stability of the base plate are permitted from the outset by the Mecanum wheels, the base plate set down on the ground could engage in centering depressions.

The wheels can preferably be extended from the base plate by electromechanical movement devices.

In a further preferred embodiment of the invention, the wheels are connected in pairs to a tubular axle which accommodates at least one wheel drives.

In order to extend the wheels, the tubular axle can be moved perpendicularly with respect to the wheel axle and possibly perpendicularly with respect to the plane of the plate completely by the electromechanical movement device.

The base plate is expediently configured in the manner of a box with a top wall and a bottom wall, wherein the top wall has fastening bores for the mounting of parts of the holding or measuring device, preferably fastening bores in a grid arrangement.

The bottom wall expediently has cutouts through which spaces for fittings are accessible.

In a further refinement of the invention, the base plate is provided with at least one bulge for the accommodation of a scanner which detects the surroundings of the plate, wherein preferably bulges are arranged at plate corners lying diagonally opposite one another. The scanners in these bulges can each detect a 270° area and thus can scan the entire surrounding area of the base plate for obstacles.

The traveling movement of the base plate may be manually remotely controllable in a wireless manner or is carried out automatically through specification of path markings or appropriate programming which orientates itself using signals of a transmitter system that is installed in the workshop in question and that generates signals in the manner of GPS signals.

In order to detect path markings, the base plate has corresponding devices, in particular a bar code reader.

BRIEF DESCRIPTION OF THE DRAWING

The invention will be explained further in the text which follows with reference to an exemplary embodiment and the accompanying drawings which relate to this exemplary embodiment and in which.

DETAILED DESCRIPTION OF THE INVENTION

Figure 1:
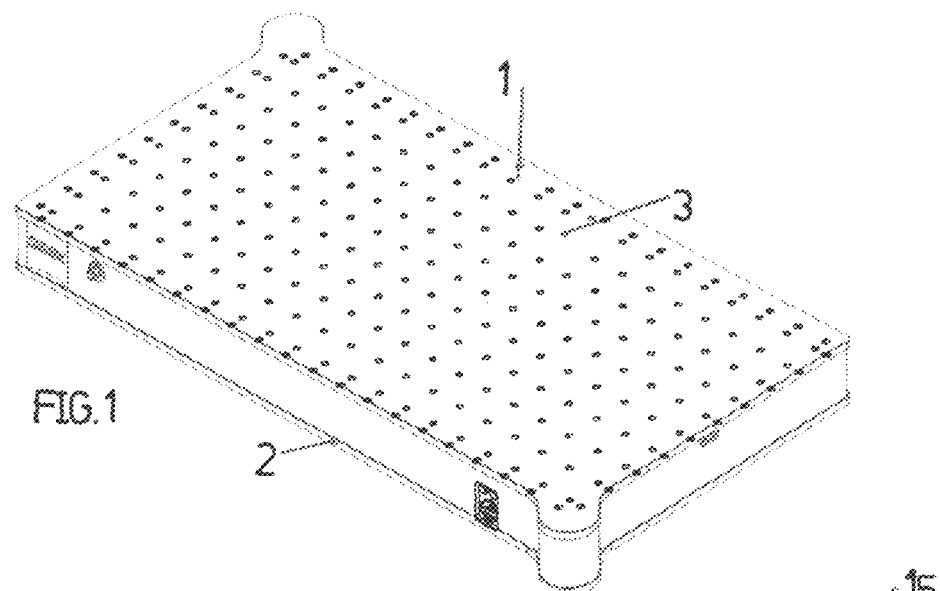
FIG. 1 shows a base plate according to the invention in a perspective view obliquely from above.
Figure 2:
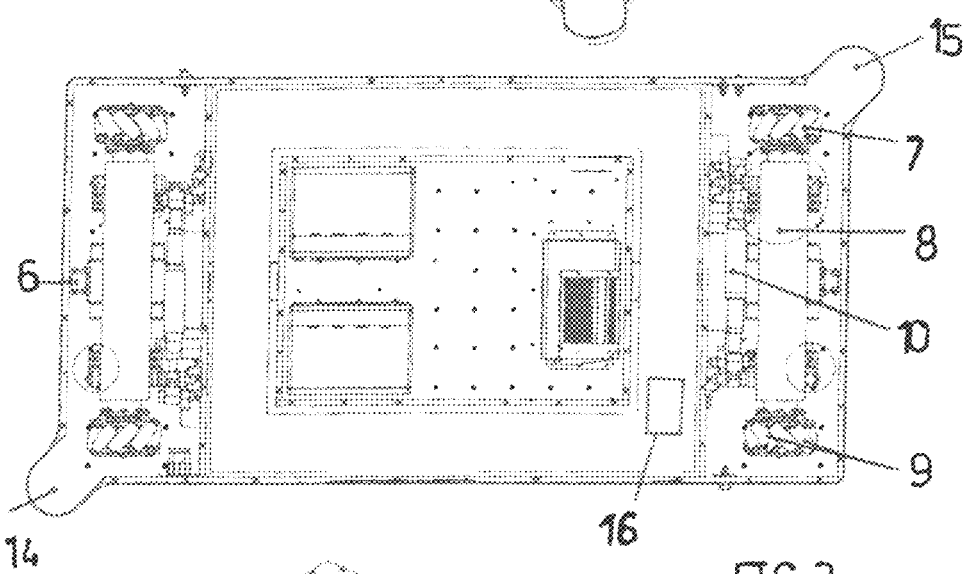
FIG. 2 shows the base plate of FIG. 1 in a plan view from below.
Figure 3:
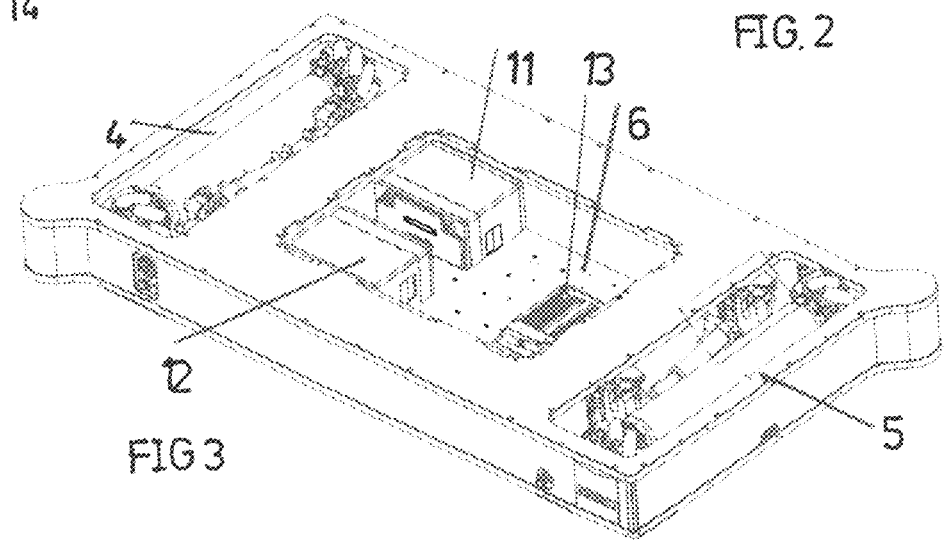
FIG. 3 shows the base plate of FIG. 1 in a perspective view obliquely from below.

A base plate for the accommodation of parts of a holder for a vehicle body component to be measured is constructed in the manner of a box and has a top wall 1 and a bottom wall 2 connected to the top wall 1 via side walls.

The top wall 1 is provided with fastening bores 3, which are arranged in a grid, for the mounting of holder parts (not shown). Formed in the bottom wall 2 are cutouts 4, 5 and 6 through which spaces, which are formed between the top wall 1 and the bottom wall 2, for fittings are accessible.

In the installation spaces that are accessible through the cutouts 4 and 5, accommodated assemblies comprise in each case a pair of wheels 7 which are connected to a tubular axle 8 which is coaxial to the wheels 7. Separately actuatable drive motors (not shown) for each of the wheels 7 are located in the tubular axle 8.

The wheels 7 are so-called Mecanum wheels comprising a rim composed of rollers 9 that can each be rotated freely about an axis inclined by 45° with respect to the axis of rotation of the wheels 7.

The assemblies furthermore each comprise electromechanical movement devices 10, by means of which the tubular axles 8 with the Mecanum wheels 7 can be moved perpendicularly with respect to the tubular axle 8, and also perpendicularly with respect to the plane of the base plate, into a position in which the Mecanum wheels 7 project out of the cutouts 4, 5.

In the exemplary embodiment shown, two accumulators 11 and 12 and a control electronics assembly 13 are located in the installation space that is accessible through the cutout 6.

The control electronics assembly 13 comprises, in particular, devices for actuating the drive motors (not shown) which are assigned to the four Mecanum wheels 7. By being able to adjust the rotation speed and direction of rotation of the wheels 7 differently in accordance with the Mecanum wheel principle, it is possible to move and turn the base plate in any desired directions without any steering of the wheels 7.

As can be seen from the figures, the base plate has in each case a bulge 14 and 15, respectively, at corners lying diagonally opposite one another. Accommodated in the bulges 14, 15, between the top wall 1 and the bottom wall 2, is a respective scanner which is connected to the control electronics assembly 13 and which scans, through a slot in the relevant side wall of the base plate, a respective 270° area at about half the height of the base plate. The control electronics assembly 13 also receives signals from an optical scanning device 16 which detects bar code markings located on the ground.

A receiving device of the control electronics assembly 13 can also wirelessly receive control signals which are input manually into a remote control.

When using the base plate, holder parts are mounted, by screw connection to fastening bores 3, on the top wall 1 of said base plate correspondingly to a vehicle body component to be measured, possibly even a complete vehicle body, and the vehicle body component is connected to the holder parts.

In order to transport the thus formed arrangement for measurement of the vehicle body component from the mounting location to a measurement location for a measuring device, in particular an optical measuring device, the four wheels 7 are extended in pairs to some extent out of the apertures 5 with the aid of the respective movement device 10 so as to raise the base plate.

The then movable arrangement is moved toward the measurement location either manually by remote control or automatically by detection of the aforementioned bar code markings which denote a travel path, wherein the Mecanum wheels permit movements and turns in accordance with the travel path.

The arrangement can thus be positioned at the measurement location at least with a precision sufficient for optical measurements solely with the aid of the Mecanum wheels. In the measurement position, the wheels 7 are retracted again and the base plate rests stably on the ground, possibly via foot parts which protrude to a slight extent.

If the scanners accommodated in the corners 14, 15 detect an obstacle during the transport journey, the control electronics assembly 13 ensures that the arrangement comes to a standstill and collisions are avoided.

Instead of automatic control of the transport journey on the basis of the aforementioned bar code markings, it would be possible to program the journey on the basis of a detection of signals generated in the manner of GPS signals in the workshop in question.

In a deviation from the exemplary embodiment described above, in the case of large plate dimensions, it would be possible to provide further wheels, which can be extended through the cutout 6, and corresponding movement devices for the wheels. The further wheels, which do not require a drive, would provide a support function.

The invention claimed is:

1. A base plate of a device for holding a vehicle body component to be measured or for measuring such a component, wherein the base plate is configured to be displaceable into a reference position for arrangement of the holding or measuring device, wherein the base plate is configured to be placeable on a ground surface and rest on the ground surface in the reference position, wherein the base plate comprises individually driven Mecanum wheels that are extendable from the base plate in a direction of the ground surface so as to raise the base plate, wherein the base plate is configured as a box with a top wall and a bottom wall, the top wall having fastening bores for mounting device parts, the fastening bores is being arranged in a grid, and wherein the base plate is configured to be remotely controlled in a wireless manner or configured so that a travel path is predetermined by path markings and/or programming.

2. The base plate according to claim 1, wherein the wheels include four wheels arranged correspondingly to corners of a rectangle.

3. The base plate according to claim 1, further comprising electromechanical movement devices that extend the wheels from the base plate.

4. The base plate according to claim 3, wherein the wheels are connected in pairs to a tubular axle that accommodates wheel drives.

5. The base plate according to claim 4, wherein, in order to extend the wheels, the tubular axle is arranged to be movable perpendicularly with respect to a wheel axle by the movement device.

6. The base plate according to claim 4, wherein the tubular axle is movable perpendicular to a plane of the base plate.

7. The base plate according to claim 1, wherein the bottom wall has cutouts through which installation spaces for fittings are accessible.

8. The base plate according to claim 1, wherein the base plate has at least one bulge for accommodating a scanner that scans surroundings of the plate.

9. The base plate according to claim 8, wherein the at least one bulge includes bulges at plate corners lying diagonally opposite one another.

10. The base plate according to claim 1, further comprising a device for detecting path markings.

11. The base plate according to claim 10, wherein the device is a bar code reader.

\* \* \* \* \*